(12) United States Patent
Svejkovsky et al.

(10) Patent No.: US 8,066,114 B2
(45) Date of Patent: Nov. 29, 2011

(54) DIFFERENTIAL IMPULSE CONVEYOR WITH IMPROVED DRIVE

(75) Inventors: Paul Svejkovsky, Rockwall, TX (US); Blake Svejkovsky, Coppell, TX (US)

(73) Assignee: Paul Svejkovsky, Rockwall, TX (US)

( * ) Notice: Subject to any disclaimer, the term of this patent is extended or adjusted under 35 U.S.C. 154(b) by 53 days.

(21) Appl. No.: 12/754,687

(22) Filed: Apr. 6, 2010

(65) Prior Publication Data

US 2011/0240442 A1 Oct. 6, 2011

(51) Int. Cl.
*B65G 27/06* (2006.01)
(52) U.S. Cl. .......................... 198/758; 198/759; 198/771
(58) Field of Classification Search ............... 198/750.1, 198/750.14, 754, 758, 759, 760, 764, 766, 198/771; 414/375, 415, 575
See application file for complete search history.

(56) References Cited

U.S. PATENT DOCUMENTS

| | | | |
|---|---|---|---|
| 2,374,663 A | 5/1945 | Carrier, Jr. | |
| 4,174,032 A * | 11/1979 | Watkins | 198/761 |
| 4,226,326 A * | 10/1980 | Watkins | 198/758 |
| 4,260,052 A | 4/1981 | Brown | |
| 4,813,532 A * | 3/1989 | Harper | 198/760 |
| 4,913,281 A | 4/1990 | Muller | |
| 4,917,655 A | 4/1990 | Martin | |
| 5,064,053 A * | 11/1991 | Baker | 198/753 |
| 5,178,258 A | 1/1993 | Smalley et al. | |
| 5,404,996 A | 4/1995 | Durnil | |
| 5,615,763 A * | 4/1997 | Schieber | 198/751 |
| 5,762,176 A * | 6/1998 | Patterson et al. | 198/770 |
| 5,794,757 A | 8/1998 | Svejkovsky et al. | |
| 5,979,640 A * | 11/1999 | Horton | 198/770 |
| 6,019,216 A | 2/2000 | Patterson | |
| 6,079,548 A | 6/2000 | Svejkovsky et al. | |
| 6,145,652 A * | 11/2000 | Durnil | 198/753 |
| 6,189,683 B1 | 2/2001 | Svejkovsky et al. | |
| 6,230,875 B1 | 5/2001 | Carlyle | |
| 6,276,518 B1 | 8/2001 | Wierman | |
| 6,398,013 B1 | 6/2002 | Svejkovsky et al. | |
| 6,415,911 B1 | 7/2002 | Svejkovksy et al. | |
| 6,415,912 B1 | 7/2002 | Tamlin | |
| 6,435,337 B1 | 8/2002 | Sahlberg | |
| 6,527,104 B2 | 3/2003 | Svejkovsky et al. | |
| 6,719,124 B2 | 4/2004 | Sahlberg | |
| 6,868,960 B2 | 3/2005 | Jones | |
| 7,216,757 B1 | 5/2007 | Patterson et al. | |
| 2008/0210525 A1 * | 9/2008 | Kemph et al. | 198/766 |

* cited by examiner

*Primary Examiner* — James R Bidwell
(74) *Attorney, Agent, or Firm* — Browning Bushman P.C.

(57) ABSTRACT

A differential impulse conveyor (10) includes a tray (12) laterally moveable in a forward direction at a first speed and in a backward direction at a second speed greater than the first speed, thereby moving goods along the tray. A plurality of legs (18, 20) support the tray during lateral movement, and a motor (30) powers a drive pulley (30). A driven pulley (36) is powered by the drive pulley, and a flexible member (34) interconnects the driven pulley and the drive pulley. At least the driven pulley has an eccentric pulley axis, thereby imparting lateral movement to the tray. A tension mechanism (38, 40) is provided to take up slack in the flexible member.

21 Claims, 2 Drawing Sheets

DIFFERENTIAL IMPULSE CONVEYOR WITH IMPROVED DRIVE

FIELD OF THE INVENTION

The present invention relates to conveyors of the type that utilize an elongate tray to move goods along the tray. More particularly, this invention relates to a differential impulse conveyor wherein a drive unit or drive assembly moves the tray forward at a first speed, then backward at a greater speed such that goods slide relative to the tray and thus move forward along the tray. The improved conveyor drive has high reliability and relatively low cost by avoiding the use of a conventional crank and associated bearings.

BACKGROUND OF THE INVENTION

Various types of conveyors have been devised which employ an elongate tray or pan having a planar surface for transporting goods thereon. These trays conventionally have sides projecting upwardly from the planar floor of the tray, such that the tray has a generally U-shaped cross-sectional configuration. Conveyors with these types of trays are preferred for various applications since the goods transported along the tray need only engage the tray during the conveying operation, and since the tray may be easily cleaned.

One type of conveyor which utilizes such a tray is a vibratory conveyor or shaker conveyor. These types of conveyors utilize a drive mechanism which essentially vibrates the tray, so that goods move along a slightly inclined or horizontal tray floor due to the forward direction imparted to the goods while raised off the floor. An earlier version of a conveyor drive is disclosed in U.S. Pat. No. 2,374,663, which utilizes a pair of crank arms. The crank arm causes a change in the rotational speed of a driven pulley. Other drives for a vibratory conveyor system are disclosed in U.S. Pat. Nos. 4,260,052, 4,913,281, 5,404,996, 6,019,216, 6,230,875, 6,276,518, 6,415,912, and 6,435,337. More recent drives for vibratory conveyors are disclosed in U.S. Pat. Nos. 6,719,124 and 6,868,960. U.S. Pat. No. 4,917,655 is directed to a timing belt tensioner.

Differential impulse conveyors have significant advantage over vibratory conveyors for many applications. Differential impulse conveyors slide goods along a tray, but do not require vertical movement of the goods with respect to the tray. Goods conveyed with a differential impulse conveyor are thus generally subject to less damage than goods transported by a vibratory conveyor. Moreover, the drive mechanism itself may operate in a quieter manner and may be less susceptible to maintenance problems. An early version of a drive for an inertial conveyor is disclosed in U.S. Pat. No. 5,178,278. Drives for differential impulse conveyors are disclosed in U.S. Pat. Nos. 5,794,757, 6,079,548, 6,189,683, 6,398,013, 6,415,911 and 6,527,104. Another type of differential impulse conveyor drive is disclosed in U.S. Pat. No. 7,216,757.

The disadvantages of the prior art are overcome by the present invention, and an improved differential impulse conveyor and a drive for such a conveyor are hereinafter disclosed.

SUMMARY OF THE INVENTION

In one embodiment, a conveyor assembly comprises a tray laterally moveable in a forward direction at a first speed, and a backward direction at a second speed greater than the first speed, thereby moving goods along the tray. This embodiment may employ a plurality of legs pivotally connected to the tray and supporting the tray during lateral movement. A motor is provided for powering a drive pulley about a drive pulley axis, and the driven pulley is powered by the drive pulley. A belt or other flexible member interconnects the driven pulley and the drive pulley, with the driven pulley mounted to one of the plurality of legs and the tray and rotatable about a driven pulley axis. At least one of the drive pulley and the driven pulley have an eccentric pulley axis, thereby imparting lateral movement to the one of the leg and the tray. The conveyor assembly further includes a tension mechanism to take up slack in the flexible member, which may be a biasing member or a tensioning pulley.

According to another embodiment of the invention, a method of conveying goods includes providing the tray and the motor discussed above, and powering a driven pulley by the drive pulley and a flexible member interconnecting these pulleys. The driven pulley may be mounted to one of a plurality of legs or the tray. One or both of the drive pulley and the driven pulley are rotated about an eccentric pulley axis, thereby imparting lateral movement to the tray.

These and further features and advantages of the present invention will become apparent from the following detailed description, wherein reference is made to the figures in the accompanying drawings.

DETAILED DESCRIPTION OF PREFERRED EMBODIMENTS

Figure 1:
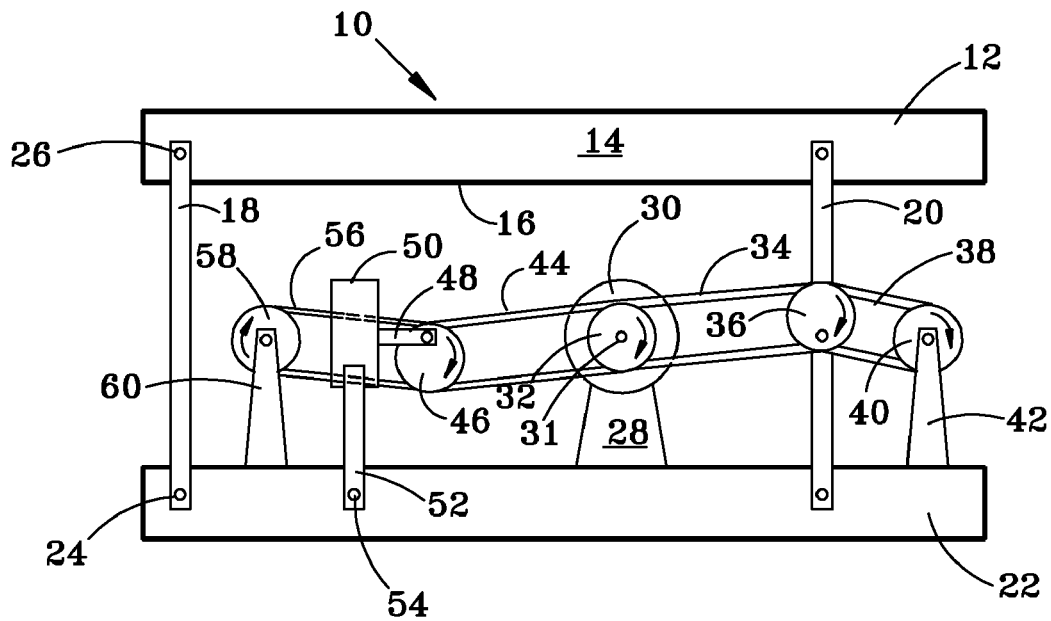
FIG. 1 illustrates one embodiment of the primary components of a differential impulse conveyor according to the present invention.

FIG. 1 illustrates one embodiment of a differential impulse conveyor 10 according to the present invention. The conveyor includes a tray 12 which moves laterally in the forward direction (to the right in FIG. 1) at a first speed, and in a backward direction at a second speed greater than the first speed, such that goods slide relative to the tray floor during the backward movement and thereby move forward with the tray as it moves forward. The tray 12 as shown in FIG. 1 may have a pair of opposing sides 14 which determine the maximum depth of the goods in the tray, such that the tray itself in cross-section has a general U-shaped configuration.

As shown in FIG. 1, a plurality of legs 18, 20 (two rearward legs 18 and two forward legs 20) are pivotally connected at 26 to the tray, and are pivotally connected at 24 to a base 22, with travel of goods along the tray in FIG. 1 being to the right. The legs 18, 20 thus support the tray during lateral movement in the forward and backward directions. Various other mechanisms may be provided for supporting the trays as discussed subsequently. The conveyor is driven by a drive motor 30 which is positioned on motor base 28 supported on the conveyor base 22. The motor 30 is conventionally powered electrically but could be powered hydraulically or pneumatically. The motor rotates a drive shaft 31, which as shown in FIG. 1 is concentrically mounted on the motor base 28. Although not shown in FIG. 1, those skilled in the art will appreciate that a speed reducer or other gear box may be positioned between the drive motor 30 and the pulley 32, so that the motor powers the speed reducer, and the output of the speed reducer rotates the pulley 32.

FIG. 1 also shows a driven pulley 36 which is eccentrically mounted on one of the plurality of legs 20, and is powered by the drive pulley 32 and a flexible member 34, such as the timing belt or a timing chain, which interconnects the drive pulley and the driven pulley. Since the driven pulley is eccentrically mounted, its rotation during a full cycle pivots the arm 20 in a forward direction at a relatively slow speed, and in a backward direction at a relatively fast speed, thereby moving goods along the tray. The distance of travel for the tray during the full forward cycle or backward cycle is relatively short, and normally in the range of from 1 to 3 inches. The vertical movement of the tray during this cycle is very limited and does not contribute to or detract from movement of goods along the tray. The timing belt 34 may pull the pulley 36 in a direction so that it rotates closer to the pulley 32, but cannot push the pulley 36 in an opposing direction to take up the slack in the timing belt. Accordingly, a tension mechanism consisting of another timing belt 38 and pulley 40 concentrically mounted on tensioning pulley base 42 are provided. The shaft on which the pulley 36 is mounted may thus effectively have two pulleys, or a single pulley with two belt grooves, so that the tensioning mechanism 38 and 40 act to pull the driven pulley 36 in a direction away from the drive pulley 32.

In order to reduce vibration in the system and contribute to a long life, as well as to reduce the noise of the conveyor drive, the drive pulley 32 driven by the motor 30 is also connected to an eccentrically mounted counterweight pulley 46, with timing belt 44 connecting the pulley 32 and the pulley 46. The pulley 46 is eccentrically mounted on arm 48 which is secured to counterweight 50, which in turn is pivotally supported on leg 52 which rotates about pivot 54 on the base 22. Another tensioning mechanism is provided by the timing belt 56 and the concentrically mounted pulley 58, which is supported on pivot base 60 secured to the base 22. Rotation of the pulley 32 thus simultaneously rotates both the eccentrically mounted pulleys 36 and 46, with the appropriate tensioning mechanisms provided for each pulley to take up the slack in the respective flexible member. Pulley 36 thus imparts the desired differential impulse movement to the tray 12, while the pulley 46 moves the counterweight 50 in a manner which opposes the momentum of the tray movement, thereby reducing vibration problems. More particularly, the eccentric mounting of the driven pulley 36 causes it to tighten and loosen belt 34, thereby moving arm 20 forward and backward. The eccentric mounting of pulley 36 also causes belt 34 to pull on a short radius, causing it to rotate fast and after 180° of rotation, and to pull on a long radius, causing it to rotate slow. The combined effect causes arm 20 to move rearward at a fast speed and forward at a slow speed, thereby causing goods to move along the tray. The counterweight and associated counterweight mechanism may not be required for all applications, i.e. small, light pans, or slow speed conveyors.

A significant advantage of the FIG. 1 embodiment is the simplicity of the drive mechanism. Various types of crank arms are not employed, thereby avoiding the costs associated with both the crank arm and the bearings which control the crank arm movement. A further significant feature of the above conveyor is that the rotational speed and thus the stroke of the tray may be easily controlled by the eccentricity of each pulley, which may be adjustable. In the present design, the pulleys change both the speed and stroke of the pan or tray.

Figure 2:
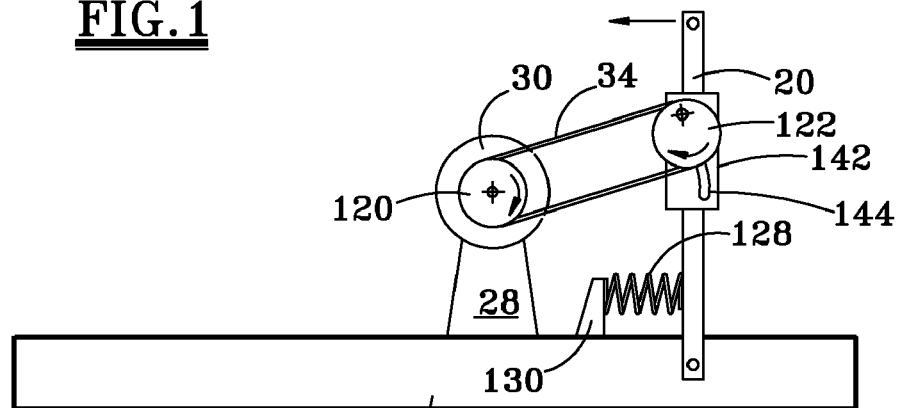
FIG. 2 illustrates a portion of an alternative conveyor with a biasing spring acting on one of the legs.
Figure 3:
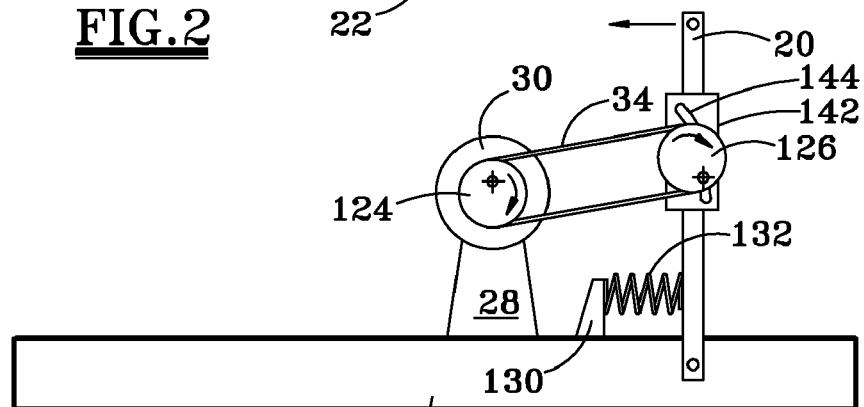
FIG. 3 illustrates the portion of another embodiment of a conveyor wherein both the drive pulley and the driven pulley are eccentrically mounted.

Subsequent drawings illustrate portions of a conveyor shown in FIG. 1, and FIGS. 2 and 3 only the front or forward supports 20 are depicted, with no pan 12. Also, the pulleys for driving a counterweight are not shown in FIG. 2 for clarity of the depicted components, although in general a counterweight and pulleys for driving the counterweight as discussed in FIG. 1 would be used for both the FIG. 2 and FIG. 3 embodiments. In FIG. 2, the drive pulley 120 is concentrically mounted with respect to motor base 28, and the timing belt 34 rotates a driven pulley 122 which is eccentrically mounted on the arm 20. This arrangement achieves the same result as the drive mechanism shown in the FIG. 1 embodiment, resulting in backward and forward movement of the tray support 20 and thus the tray. In the FIG. 2 embodiment, a spring, such as spring 128, acts between the leg 20 and the spring base 130, thus exerting a continual force to bias the leg 20 away from the drive pulley 120. In FIG. 2, the concentric pulley is mounted on the motor and the eccentric pulley on the arm 20. Belt tension and the slow forward movement is provided by the spring in lieu of pulley 40 and belt 38 as shown in FIG. 1.

Fine tuning between the stroke and the fast/slow ratio may be achieved by varying the height of the driven pulley 122 in relation to the height of the driving pulley 120. Eccentric pulley 122 is thus adjustably positionable along curved slot 144 in guide plate 142, which is secured to arm 20. The pulley 122 may be locked in a selected position to adjust the stroke length and the slow forward/fast backward ratio. Moving the pulley 122 upward within the slot 144 changes the angle of the belt 34, which shows inclines substantially when the pulley 122 is positioned as shown in FIG. 2. Increasing the belt angle from horizontal changes the timing between the slow forward/fast backward movement of the tray and the cranking mechanism involved in that motion. Adjustment of this timing by selectively varying the angle of the driven pulley relative to the drive pulley thus allows for optimization to travel over specific product moving along the tray, so that the selected belt angle is a part of function of the product being conveyed.

In the FIG. 3 embodiment, both the drive pulley 124 and the driven pulley 126 are eccentrically mounted, with the spring 132 acting as the tension mechanism to take up slack in the flexible member 132 in a manner similar to that achieved with the compensating pulley 40 and the belt 38 shown in FIG. 1. The FIG. 3 embodiment allows the eccentricity of the pulley to be half of the pulley used in the FIG. 1 and FIG. 2 embodiments, thereby allowing the timed pulleys to be smaller in diameter with reduced out-of-balance forces. For all the embodiments, substantial stops to limit travel in the forward and backward directions may be provided to minimize over travel of the arms and tray in the event of a belt breakage. A similar mechanism is shown in FIG. 3 for fine-tuning the conveyor performance by varying the angle of the driven pulley with respect to the drive pulley. In other embodiments, either the drive pulley or both the drive pulley and the driven pulley may be selectively adjustable, since a change in their relative position is important. Other mechanisms may be used for facilitating that adjustment and then selectively locking the position of the adjustable pulley in place.

Figure 4:
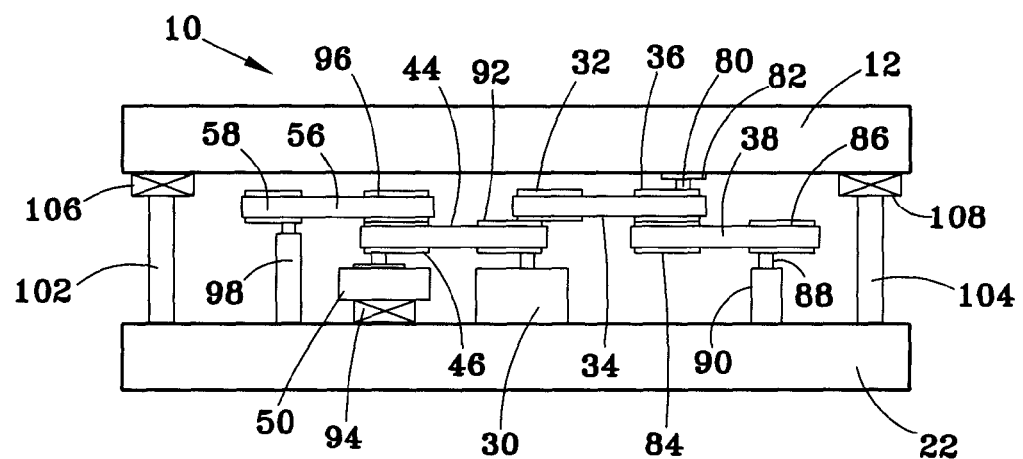
FIG. 4 illustrates a side view of another embodiment of a portion of a conveyor, wherein each of the drive pulley and the driven pulley have a substantially vertical axis.

FIG. 4 is a side view of the conveyor 10 with a tray 12 as discussed above. The drive pulley 32 driven by motor 30 powers a driven pulley 36 which is interconnected with the drive pulley via a timing belt 34. Pulley 36 eccentrically rotates about axis 80, which is laterally fixed by plate assembly 82 directly to the pan 12. Another pulley 84 rotates about the same axis 80, with the belt 38 connecting pulley 84 with compensating pulley 86, which eccentrically rotates about the shaft 88 and is rotatably about support 90 secured to the base 22. As with the FIG. 1 embodiment, the motor also rotates pulley 92, which acts through the belt 44 to rotate pulley 46, which is in turn moves counterweight 50 slidably supported on pad 94. Pulley 96 is also rotated by the drive motor and belt 44, with belt 56 driving pulley 58 which is eccentrically supported on base post 98. A plurality of support legs 102, 104 may support the tray 12 on the base 22, with bearing slide packages 106 and 108 providing for sliding movement of the tray relative to the base in both the forward and backward directions.

Figure 5:
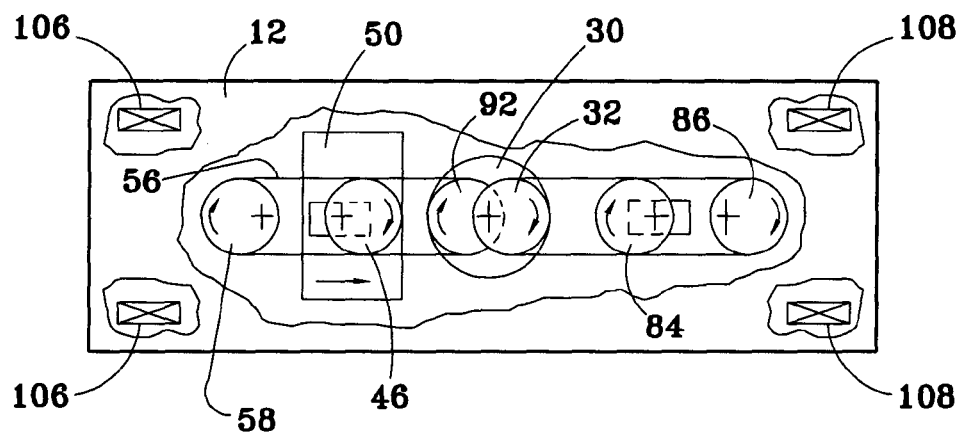
FIG. 5 is a top view, partially in cut-away, of the conveyor shown in FIG. 4.

FIG. 5 is a top view of the assembly shown in FIG. 4, with a portion of the tray 12 cutaway to shown the orientation of the primary components of the drive mechanism. An advantage over the previous embodiments is that the space between the floor of the tray and the base in the FIG. 5 embodiment may be relatively short because the axes of the pulleys are each substantially vertical in the FIGS. 4 and 5 embodiment, rather than being substantially horizontal as shown in the FIGS. 1-3 embodiments. Also, this embodiment shows the option of interconnecting the driven pulley directly to the tray, with the legs 102, 104 only supporting the tray during lateral movement. In alternate embodiments, the tray could be otherwise supported so that it slid back and forth during operation of the drive. In some applications, the tray may be supported from rods or arms extending upward from the tray to a roof or other overhead structure.

The embodiment as shown in FIGS. 4 and 5 has significant advantages in that the vertical spacing between base 22 and the tray 12 may be relatively short. This allows for the possibility of the conveyor to fit within a relatively small vertical spacing, and also allows the possibility of a plurality of conveyors to be vertically stacked in a desired arrangement.

The conveyor assembly includes a driven pulley mounted to one of the plurality of legs or the tray, with the driven pulley rotatable about a driven pulley axis. At least one of the drive pulley and the driven pulley have an eccentric pulley axis, thereby imparting movement in either the forward direction or the backward direction to the tray. A tension mechanism takes up slack in the flexible member so that the flexible member returns the tray back to its starting position by moving the tray in the other of the forward direction or the backward direction. The belt or other flexible member may pull the tray in either the forward direction at a first slow speed, or may pull the tray in a backward direction at a second speed greater than the first speed, thereby moving goods forward along the tray. The tension mechanism thus acts to return the tray in the opposite direction, which may correspond to travel of the tray at either a slow forward speed or faster return speed.

Two embodiments of a tension mechanism to take up the slack in the flexible member are disclosed. In one embodiment, a spring or other biasing member exerts a biasing force to bias the tray or one of the legs away from the drive pulley, and this biasing force may result in either a slow forward or faster return motion for the tray. In another embodiment, the tension mechanism comprises a tension pulley mounted to a stationary base, with a flexible tensioning member interconnecting the driven pulley and the tensioning pulley. Either tension mechanism may cause either the slow forward or faster return motion of the tray, with the drive pulley and the driven pulley causing the other tray motion.

FIG. 1 illustrates a feature of the invention wherein each of the shafts for the pulleys 32 and 36, and optionally also shaft 40, shaft 46, and shaft 58, if used, are at the same horizontal level, i.e., within a plane parallel to the floor. This design simplifies the operation of the system, so that fine tuning the system can be commenced with this starting point. More particularly, lowering the drive shaft 31 from this starting point provides a selective change in timing between the rotation of the drive shaft and the lateral movement of the tray. In some applications, it may be desirable to vertically change the height of shaft 31 relative to the shaft drive for pulley 36, as effectively shown in FIGS. 2 and 3. Even for this embodiment, all shafts other than shaft 31 preferably may be at the same horizontal level.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A conveyor assembly, comprising:
 a tray laterally moveable in a forward direction at a first speed and in a backward direction at a second speed greater than the first speed, thereby moving goods along the tray;
 a plurality of legs connected to the tray and supporting the tray during lateral movement;
 a motor for powering a drive pulley about a drive pulley axis;
 a driven pulley powered by a drive pulley;
 a flexible member interconnecting the drive pulley and the driven pulley, the driven pulley mounted to one of the plurality of legs and the tray and rotatable about a driven pulley axis;
 the driven pulley having an eccentric pulley axis, thereby causing the tray to move in the forward direction and the backward direction; and
 a tension mechanism to take up slack in the flexible member such that the flexible member returns the tray by moving the tray in the other of the forward direction and the backward direction.

2. A conveyor assembly as defined in claim 1, wherein the tension mechanism comprises:
 a biasing member for exerting a biasing force on at least one of the tray and one of the plurality of legs to bias the tray laterally away from the drive pulley.

3. A conveyor assembly as defined in claim 2, wherein the biasing member is a spring.

4. A conveyor assembly as defined in claim 1, wherein the tension mechanism comprises a tensioning pulley concentrically mounted to a stationary base, and a flexible tensioning member interconnecting the driven pulley and the tensioning pulley.

5. A conveyor assembly as defined in claim 1, wherein the flexible member is one of a timing belt and a link chain.

6. A conveyor assembly as defined in claim 1, further comprising:
 another driven pulley powered by the motor, the another driven pulley mounted to a counterweight.

7. A conveyor assembly as defined in claim 6, further comprising:
 another tension mechanism to take up slack in other flexible member interconnecting the drive pulley and the another driven pulley.

8. A conveyor assembly as defined in claim 1, further comprising:

an adjustment mechanism for selectively adjusting a center of rotation of the drive pulley with respect to a center of rotation of the driven pulley.

9. A conveyor assembly as defined in claim 1, wherein each of the drive pulley and the driven pulley rotate about a substantially horizontal axis.

10. A conveyor assembly as defined in claim 1, wherein each of the drive pulley and the driven pulley rotate about a substantially vertical axis.

11. A conveyor assembly as defined in claim 1, wherein each of the plurality of legs is pivotably supported at one end to a base and at another end to the tray.

12. A conveyor assembly, comprising:
   a tray laterally moveable in a forward direction at a first speed and in a backward direction at a second speed greater than the first speed, thereby moving goods along the tray;
   a plurality of legs connected to the tray and supporting the tray during lateral movement each of the plurality of legs being pivotably supported at one end to a base and at another end to the tray;
   a motor for powering a drive pulley about a concentric drive pulley axis;
   a flexible member including one of a timing belt and a link chain interconnecting the drive pulley and a driven pulley powered by a drive pulley;
   the driven pulley mounted to one of the plurality of legs and the tray;
   the driven pulley having an eccentric pulley axis, thereby causing the tray to move in the forward direction and the backward direction; and
   a tension mechanism to take up slack in the flexible member such that the flexible member returns the tray by moving the tray in the other of the forward direction and the backward direction.

13. A conveyor assembly as defined in claim 12, wherein the tension mechanism comprises:
   a biasing member for exerting a lateral biasing force on at least one of the plurality of legs and the tray to bias the tray laterally away from the drive pulley.

14. A conveyor assembly as defined in claim 12, wherein the tension mechanism comprises a tensioning pulley mounted on the base, and a tensioning member interconnecting the eccentric driven pulley and the tensioning pulley.

15. A conveyor assembly as defined in claim 12, further comprising:

an adjustment mechanism for selectively adjusting a center of rotation of the drive pulley with respect to a center of rotation of the driven pulley.

16. A method of conveying goods, comprising:
   moving a tray laterally in a forward direction at a first speed and in a backward direction at a second speed greater than the first speed, thereby moving goods along the tray;
   providing a plurality of legs connected to the tray and supporting the tray during lateral movement;
   providing a motor for powering a drive pulley about a drive pulley axis;
   powering a driven pulley by a drive pulley and a flexible member interconnecting the drive pulley and the driven pulley, the driven pulley mounted to one of a plurality of legs and the tray;
   mounting the driven pulley about an eccentric driven pulley axis, thereby causing the tray to move in the forward direction and the backward direction; and
   providing a tension mechanism to take up slack in the flexible member such that the flexible member returns the tray by moving the tray in the other of the forward direction and backward direction.

17. A method as defined in claim 16, wherein providing a tension mechanism comprises:
   exerting a biasing force on at least one of the plurality of legs to bias the leg laterally away from the motor.

18. A method as defined in claim 16, wherein providing a tension mechanism comprises:
   concentrically mounting a tensioning pulley to a stationary base; and
   providing a flexible tensioning member interconnecting the eccentric driven pulley and the tensioning pulley.

19. A method as defined in claim 16, further comprising:
   providing another driven pulley powered by the motor, the another driven pulley eccentrically mounted to a counterweight.

20. A method as defined in claim 16, further comprising:
   selectively adjusting a center of rotation of the drive pulley with respect to a center of rotation of the driven pulley.

21. A method as defined in claim 16, wherein each of the plurality of legs is pivotably supported at one end to a base and at another end to the tray.

* * * * *